S. B. WINN.
TRAILER ATTACHMENT FOR VEHICLES.
APPLICATION FILED JAN. 5, 1918.
1,316,660. Patented Sept. 23, 1919.
2 SHEETS—SHEET 1.
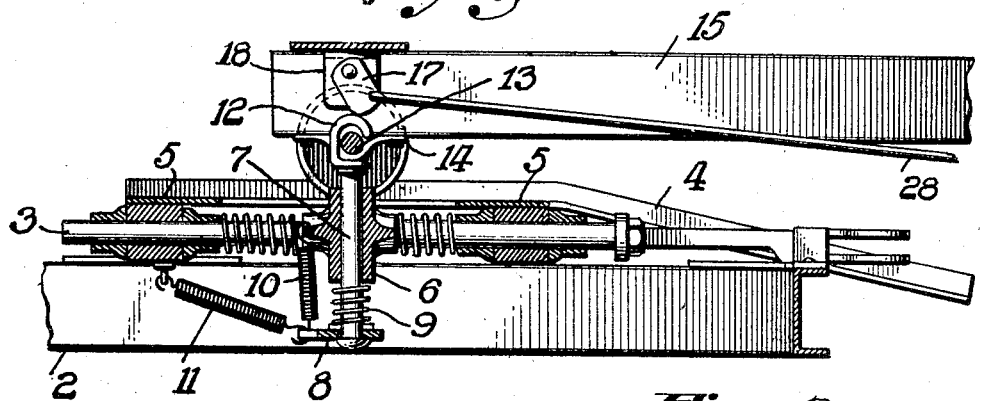
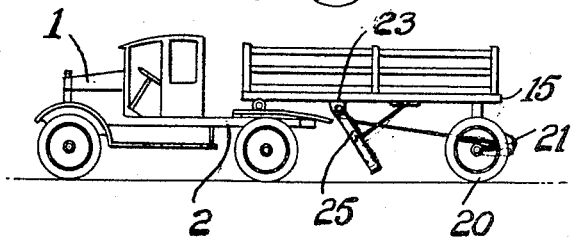
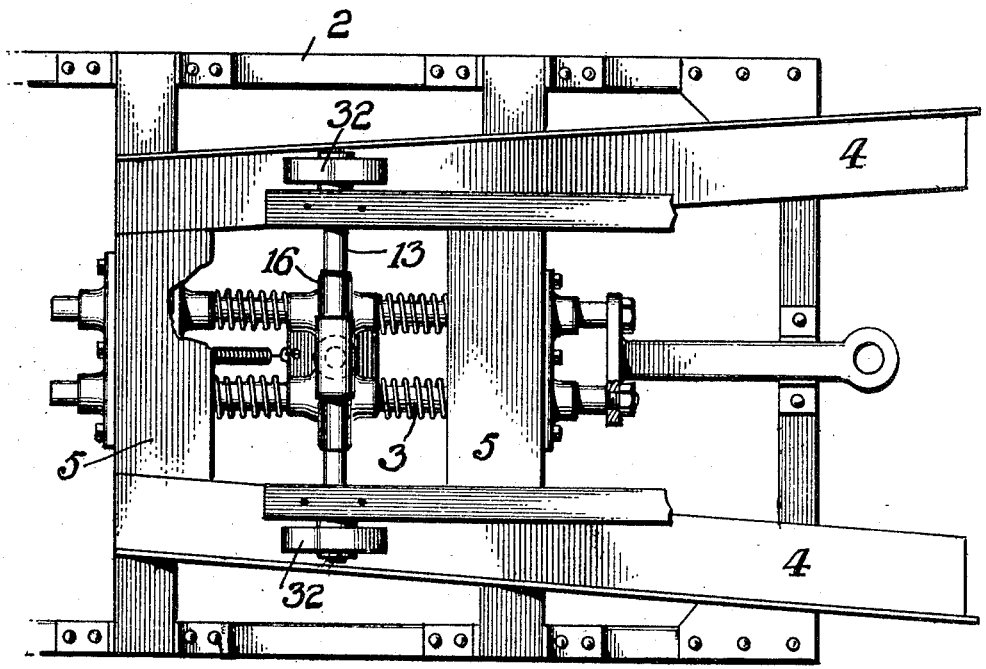
Inventor
SIDNEY B. WINN.
By
Attorneys

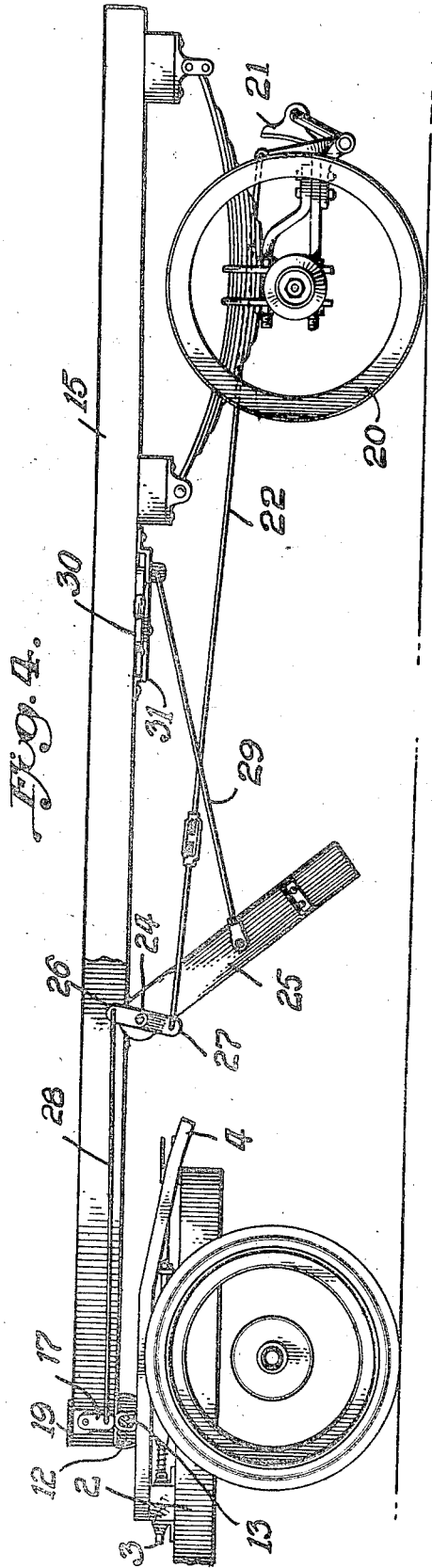
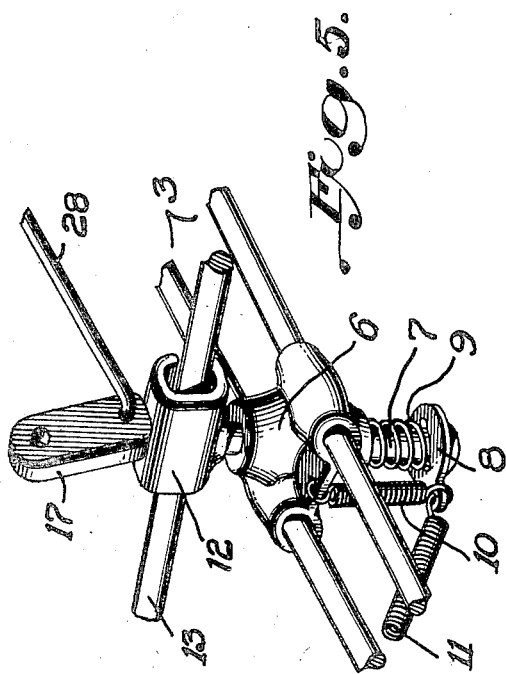

UNITED STATES PATENT OFFICE.

SIDNEY B. WINN, OF LAPEER, MICHIGAN, ASSIGNOR TO LAPEER TRACTOR-TRUCK CO., OF LAPEER, MICHIGAN, A CORPORATION OF MICHIGAN.

TRAILER ATTACHMENT FOR VEHICLES.

1,316,660.      Specification of Letters Patent.      Patented Sept. 23, 1919.

Application filed January 5, 1918. Serial No. 210,413.

*To all whom it may concern:*

Be it known that I, SIDNEY B. WINN, a citizen of the United States of America, residing at Lapeer, in the county of Lapeer and State of Michigan, have invented certain new and useful Improvements in Trailer Attachments for Vehicles, of which the following is a specification, reference being had therein to the accompanying drawings.

This is an improvement in connection with my Patent No. 1,249,705, granted Dec. 11, 1917, showing a trailer attachment for vehicles, and more particularly a six wheel vehicle having separable parts with a novel coupling mechanism, fifth wheel, and draft appliance associated with the separable parts of the vehicle, so that the vehicle parts will be yieldably connected, somewhat similar to a universal joint, to permit of one part readily manipulating the other part. The improvement may also be considered in connection with the disclosure of my pending application Serial No. 210,414, filed under even date.

The present invention aims to provide a two wheel or single truck trailer having a supporting leg or member with brakes that will be set when the trailer is uncoupled from a truck, tractor or self propelled vehicle, and the leg or rest member shifted into an active position to coöperate with the two wheel or single truck of the trailer in supporting the same.

My invention further aims to provide a trailer attachment that may be easily and quickly coupled to a truck and the trailer attachment has brakes that are applied when the trailer attachment is uncoupled, and released when the trailer is coupled to a truck.

The means employed for accomplishing the above results is disposed so as not to interfere with the running gear of the truck or trailer, and preferably so that it may be actuated from the side of the trailer attachment and thus obviate the necessity of a driver or helper reaching under the trailer or endangering his life when coupling or uncoupling the trailer attachment.

My invention will be hereinafter described and then claimed, and reference will now be had to the drawing, wherein—

Figure 1 is a longitudinal sectional view of a portion of a truck frame, a trailer frame, and showing a draft appliance and coupling device by which the trailer frame may be connected to the truck frame;

Fig. 2 is a diagrammatic elevation of a six wheel vehicle in accordance with this invention;

Fig. 3 is a plan of the parts shown in Fig. 1;

Fig. 4 is a side elevation of a portion of the truck and trailer, partly in section, showing the trailer coupled to the truck, and Fig. 5 is a perspective view of the draft appliance, and the coupling device.

In the drawing, the reference numeral 1 denotes a four wheel truck, tractor or self propelled vehicle having a frame 2, and supported by the rear end of the frame 2 is a draft appliance 3 and a track 4, said track having transverse members 5 that coöperate therewith in providing part of a fifth wheel.

The draft appliance 3 affords a support 6 for a king bolt 7 that may turn about its vertical axis in the support 6 and vertically shift therein. The lower end of the king bolt 7 has a fixed head or member 8 and encircling said king bolt between the head 8 and the support 6 is a coiled compression spring 9. Another coiled retractile spring 10 connects the head 8 and the support 6, the force of the spring 10 being greater than that of the spring 9 so as to hold the king bolt 7 normally elevated. The head 8 is also connected by a coiled retractile spring 11 to the forward end of the draft appliance 3 and the retractile force of this spring is adapted to hold the king bolt normally against rotation, yet permit of the king bolt rotating about its axis when necessary.

On the upper end of the king bolt 7 is a hook or C shaped head 12 adapted to receive an axle 13 carried by suitable bearings 14 at the forward end of the trailer frame 15. The head 12 and the king bolt 7 constitute a coupler device for the trailer frame 15, and the head 12 is open at its rear side so as to receive the axle 13. This axle has collars or members 16 adapted to engage the sides of the head 12, so as to maintain the axle in proper position to the king bolt, particularly when the trailer is at an angle to the truck. Wheels 32 on the axle 13 will properly longitudinally center the trailer relative to the truck or tractor as the wheels ride on the track 4 and engage the outer flanges thereof, but since the transverse members 5 are devoid of guiding flanges, the collars or members 16 will prevent the axle 13 from shifting through the coupler head, when the trailer is at an angle to the truck.

With the head 12 normally elevated by the spring 10, the spring 9 is held against the support 6 and as this spring is of greater tension than the spring 10 it will produce a snap action on the part of the king bolt when the head thereof engages the axle by the truck being backed under the forward end of the trailer frame. The head of the king bolt will snap into engagement with the axle, and to lock the head 12 in engagement with said axle, there is a pivoted wedging member 17 disposed in a hanger 18 carried by a transverse member 19 on the forward end of the frame 15. The wedging member 17 is adapted to be shifted from position shown in Fig. 1 to the position shown in Fig. 4, thereby lowering the bolt 7 until the upper portion of the head 12 embraces the axle 13, establishing a relation between the head 12 and the axle 13 that permits of the truck moving the trailer frame 15 in a desired direction.

The rear of the trailer frame, as best shown in Fig. 4, is supported by a single truck or two wheels 20 and movable to and from these wheels are brake shoes 21 carried by a suitable brake rigging, which includes a forwardly extending rod 22 that permits of the shoes being adjusted, either to set or hold the wheels 20 or to release the same.

Contiguous to the forward end of the trailer frame 15 are bearings 23 for a rock shaft 24 and on said rock shaft is a leg or rest member 25 and cranks 26 and 27. These cranks may be made as one member or separate. The crank 27 is connected to the forward end of the rod 22 and the crank 26 is connected by a rod 28 to the wedging member 17, and in consequence of this arrangement, the brake shoes 21 will be applied to the wheels 20 when the leg or rest member 25 is lowered to support the forward end of the trailer frame, and the wedging member 17 will be retracted so that the king bolt 7 may be elevated and permit of the truck moving away from the trailer.

To obviate the necessity of a truck man or laborer reaching under the trailer to set the leg or rest member 25, said leg or rest member is connected by a rod or brace 29 to a horizontally disposed pivoted lever 30 arranged in a suitable guide 31 and projecting from the side of the trailer frame. By swinging the lever 30 the leg or rest member 25 may be raised or lowered, but said leg or rest member is never raised until the truck has backed under the forward end of the trailer; the rod or brace 29 serves to prevent a tilting action of the rest member when in an active position, and the lever 30 and its guide 31 have been simply shown as a conventional form of means for locking the brace against accidental displacement in either position. The track 4, which has been described in my prior patent permits of the truck backing under the trailer and this can be nicely accomplished since the brake shoes 21 are applied to set the wheels 20. After the coupler device of the truck has encountered the axle 13, the leg or rest member 25 may be raised. The brakes will be released and the wedging member 17 will lock the coupling device in engagement with the forward end of the trailer frame, thus permitting of the truck easily manipulating the trailer.

The manner in which the wheels 32 of the trailer axle 13 ride on and off the track 4 and turn thereon, similar to the movable part of a fifth wheel, has been brought out in my prior patent, and by equipping a truck and trailer attachment with the devices herein disclosed, it is practically impossible for a truckman to leave a trailer without its leg or rest member being in position to support the forward end of the trailer. Then again, the brakes will prevent the trailer from accidentally shifting while a truck is moving into or out of engagement therewith.

What I claim is:—

1. A vehicle having separable parts, one part adapted for moving the other part, and a coupling device for such part including a shiftable locking member, in combination with brakes for one part, and means for simultaneously applying said brakes and shifting the locking member of said coupling device.

2. The combination of a truck, a trailer, a coupling device adapted to connect said trailer to said truck, locking means for said coupling device, brakes for said trailer, and a rest member for said trailer adapted to simultaneously control said brakes and the locking means of said coupling device.

3. The combination of a truck having a coupling device including a king bolt, a trailer adapted to be placed in engagement with the king bolt of said truck, brakes for said trailer, and means carried by said trailer adapted to simultaneously set said brakes and lock the king bolt of said truck in engagement with said trailer.

4. The combination of a truck having a coupling device including a king bolt, a trailer having a front axle adapted to engage the king bolt of said truck, brakes for said trailer, and means carried by said trailer adapted to simultaneously apply said brakes, support the forward end of said trailer, and release the king bolt of said truck relatively to the forward end of said trailer.

5. The combination of a truck, a trailer adapted for engagement and disengagement with a truck, means carried by said truck so that said trailer may be moved therewith, locking means adapted to maintain the engagement of said trailer with said truck, brakes for said trailer, a rest member carried by said trailer adapted to support the forward end thereof when disengaged from said truck, and means actuated by said rest member adapted to control said brakes and said locking means.

6. The combination of a truck, a trailer, coupling means including a shiftable member adapted for connecting said trailer to said truck, brakes for said trailer, a rest member carried by said trailer adapted to support the forward end thereof when uncoupled relatively to said truck, means connected to said rest member and operatable at the side of said trailer for adjusting said rest member, and means actuated by said rest member adapted to control said brakes and the shiftable member of said coupling means between said truck and said trailer.

7. In a vehicle, a tractor, a trailer, a coupling device adapted to connect said trailer to said tractor, and a rest member for said trailer adapted in an inactive position to prevent uncoupling of said trailer relative to said truck.

8. In a vehicle, a tractor, a trailer, a coupling device adapted to connect said trailer to said tractor, a rest member for said trailer when disconnected from said tractor, and means actuated by said rest member when placed in an inactive position to lock said coupling device so that said trailer and tractor cannot be separated while said rest member is in an inactive position.

In testimony whereof I affix my signature in the presence of two witnesses.

SIDNEY B. WINN.

Witnesses:
  E. E. MIX,
  G. R. BUCK.